United States Patent
Roden, III et al.

(10) Patent No.: US 9,208,353 B2
(45) Date of Patent: Dec. 8, 2015

(54) MALWARE AND TAMPER RESISTANT COMPUTER ARCHITECTURE

(71) Applicant: Raytheon BBN Technologies Corp., Cambridge, MA (US)

(72) Inventors: Thomas Gilbert Roden, III, New Windsor, MD (US); John-Francis Mergen, Baltimore, MD (US); Carl Marshall Elliot Powell, Gaithersburg, MD (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 168 days.

(21) Appl. No.: 13/766,401

(22) Filed: Feb. 13, 2013

(65) Prior Publication Data

US 2014/0229743 A1 Aug. 14, 2014

(51) Int. Cl.
  *G06F 7/24* (2006.01)
  *G06F 21/71* (2013.01)
  *G06F 21/79* (2013.01)

(52) U.S. Cl.
  CPC ............... *G06F 21/71* (2013.01); *G06F 21/79* (2013.01); *G06F 2221/2107* (2013.01)

(58) Field of Classification Search
  USPC ............ 713/190, 194; 712/213; 711/211, 214
  See application file for complete search history.

(56) References Cited

U.S. PATENT DOCUMENTS

| | | | | |
|---|---|---|---|---|
| 5,832,257 | A | * | 11/1998 | Touriguian et al. ............ 712/220 |
| 7,917,735 | B2 | * | 3/2011 | Greenhalgh ................... 712/213 |
| 8,219,772 | B2 | * | 7/2012 | Smith et al. ................... 711/163 |
| 2005/0166036 | A1 | * | 7/2005 | Catherwood et al. ........... 712/34 |

OTHER PUBLICATIONS

"A Brief view of Computer Architecture", 4 pgs.
"Harvard vs Von Neumann", [Online]. Retrieved from the Internet: <http://infocenter.arm.com/help/index.jsp?topic=/com.arm.doc.faqs/ka11516.html>, (Accessed Oct. 24, 2012), 1 pg.
"SHARC Processors", [Online]. Retrieved from the Internet: <http://www.analog.com/en/processors-dsp/sharc/products/index.html>, (Accessed Oct. 24, 2012), 2 pgs.

* cited by examiner

*Primary Examiner* — Eleni Shiferaw
*Assistant Examiner* — Paul Callahan
(74) *Attorney, Agent, or Firm* — Schwegman Lundberg & Woessner, P.A.

(57) ABSTRACT

Generally described herein are methods and systems for enhanced tamper and malware resistant computer architectures. A system for enhanced tamper and malware resistance can include a harvardizer configured to receive comingled instructions and data and produce separated instructions and data. A data memory can be configured to receive the separated data. An instruction memory that is physically separate from the data memory can be configured to receive the separated instructions. The system can include one or more computer processors that can be configured to execute the separated instructions and data. The system can include one or more encryptors or decryptors to help thwart injection based attacks.

4 Claims, 6 Drawing Sheets

MALWARE AND TAMPER RESISTANT COMPUTER ARCHITECTURE

TECHNICAL FIELD

This disclosure relates generally to systems and methods that include computer architectures, and more specifically to systems and methods that include tamper and malware resistant computer architectures.

BACKGROUND ART

Microprocessors can use a single bus for both instruction and data memory accesses. Such microprocessors are a part of systems with Von Neumann architectures. These systems have shared signals and memory for code and data. Thus, a program being run in such a setting can be modified by itself when it is stored in read-write memory.

DESCRIPTION OF THE EMBODIMENTS

In the following detailed description, reference is made to the accompanying drawings that form a part hereof, and in which is shown by way of illustration specific embodiments in which the inventive subject matter can be practiced. These embodiments are described in sufficient detail to enable those skilled in the art to practice them, and it is to be understood that other embodiments can be utilized and that structural, logical, and electrical changes can be made without departing from the scope of the inventive subject matter. Such embodiments of the inventive subject matter can be referred to, individually and/or collectively, herein by the term "invention" merely for convenience and without intending to limit the scope of this application to any single invention or inventive concept if more than one is in fact disclosed. The following description is, therefore, not to be taken in a limited sense, and the scope of the inventive subject matter is defined by the appended claims.

The majority of microprocessors currently utilize a single bus for instruction and data memory accesses. This type of architecture is known as the Von Neumann architecture. A program running on a microprocessor with a Von Neumann architecture can modify itself. Such modification can be made through malicious intent (e.g., through malware).

Figure 1:
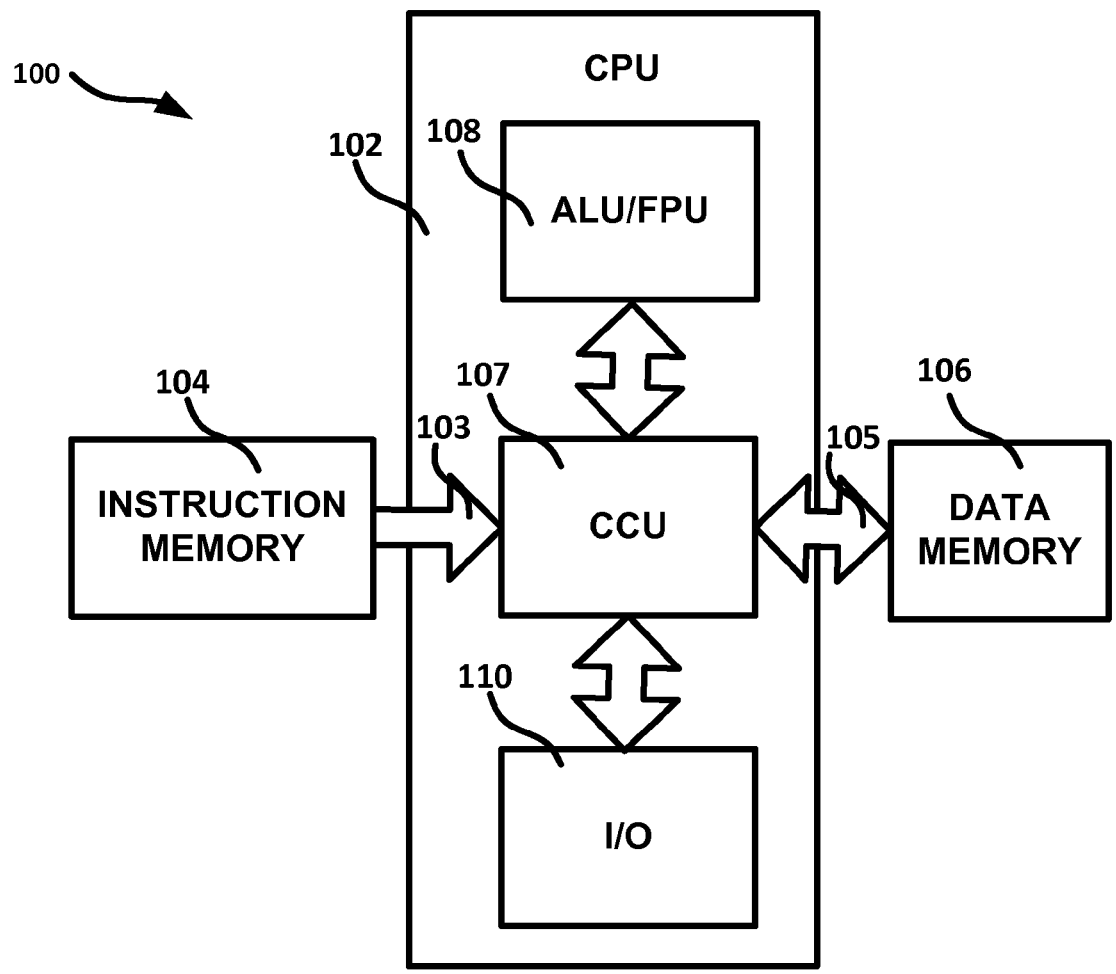
FIG. 1 shows a block diagram of an example of a system with a Harvard architecture.

Some microprocessors can use memory architectures that have separate data and address buses for instruction and data storage. These two sets of buses allow the processor to retrieve a data word and an instruction simultaneously. This type of architecture is known as a Harvard architecture and is shown in FIG. 1, among others. The Harvard architecture can include physically separate data and instruction memory. The data memory can be read-write and the instruction memory can be read only. A program running on a computer with such an architecture cannot modify itself. Modified Harvard architectures, such as an Advanced Reduced instruction set computing Machine (ARM), have been proven to include security vulnerabilities. A pure Harvard architecture that includes independent and physically separate (e.g., not sharing any buses or memory spaces) instruction and data spaces can be secure, predictable, or trustworthy.

Methods for implementing execution assurance, malware protection, or tamper resistance are commonly implemented in software. This can create security vulnerabilities in a system with a Von Neumann architecture. This is because, in part, the system is dependent on itself for protection. Execution assurance, malware protection, and tamper resistance depend upon in-band mechanisms or actions that are self-observable in the environment. For example, McAfee anti-virus software lives on the platform that it is built to protect. When the system is built using a Von Neumann architecture these systems are prone to attacks. Since the instructions and data in a Von Neumann architecture are comingled, an attacker can mimic instructions by injecting code into the combined data/instruction signal path. Thus, software based malware protection and tamper resistance solutions can be compromised.

Software based solutions to these problems often require continuous maintenance. As new threats to the computer that the software resides on are discovered, new malware protection and tamper resistance code needs to be added to the software to protect from these threats. Often this is accomplished in the form of updates.

Other issues can arise when the underlying architecture is fundamentally vulnerable to attacks or otherwise flawed. The systems and methods discussed herein can provide protection from a variety of code injection techniques or program flaws, which may not necessarily be attacks, but can be defects in the program's construction. Some examples of code injection techniques include, but are not limited to techniques that exploit: stack-based buffer overflows, heap (.BSS) segment buffer overflows, data (.DATA) segment buffer overflows, dangling pointer references (e.g., double free), format string, return to library, signedness, or integer overflow. Systems and methods discussed herein can be immune or protected from attacks that manifest themselves as: stack frame corruptions (since systems and methods herein can include separate instruction call stack that is inaccessible from the data space), or returning to library (e.g., calling an "abort" function).

Generally described herein are methods and systems for enhanced tamper and malware resistant computer architectures. A system for enhanced tamper and malware resistance can include a harvardizer configured to receive comingled instructions and data and produce separated instructions and data. A data memory can be configured to receive the separated data. An instruction memory that is physically separate from the data memory can be configured to receive the separated instructions. The system can include one or more computer processors that can be coupled to the data memory and the instruction memory and configured to execute the separated instructions and data.

Computer systems described herein can be included in a number of applications, such as applications using separation kernels, secure real-time micro-kernels (e.g., small pieces of code that provide the essential elements of a given processor), Fault Detection, Isolation, and Recovery (FDIR) (e.g., flight control applications, nuclear power plant control, medical, or military systems), or high-assurance, security, anti-tamper, and anti-malware embedded systems. Examples of such applications include secure video devices, tactical handheld radios, front-ends for Intelligent Surveillance and Reconnaissance (ISR), secure communications modules, sensors, or telemetry units.

Configuring a computer system to include fully independent instruction and data spaces can help improve the security of the computer system. Using byte-code transformation ("Harvardization") or encryption, systems can reduce the attack surfaces that exist as a result of shared instruction and data spaces or buses used in many computer systems. Encryption of the instruction, data, and microcode spaces can help thwart tampering and reverse engineering. The pre-execution of Harvardized code can help disable byte-code based attacks, such as code injection attacks.

Systems described herein can be configured to execute legacy Von Neumann architecture instruction sets in a system with a Harvard architecture (e.g., a pure Harvard architecture). A pure Harvard architecture means a system where instructions and data formatted for execution in a Von Neumann environment can be transformed to a form executable by a system with a Harvard architecture. The transformed instructions and data can be encrypted, such as by using a relatively low-latency encryption algorithm and low-latency decryption algorithm (e.g., combinatorial algorithms that can combine arithmetic and logical operations such as a one-time pad algorithm or other algorithm). The encryption and decryption algorithm used is flexible and can be chosen based on the needs of the application. The decrypted instructions and data can be transmitted to a Transformation Execution Engine (TXE) which can be configured to execute legacy instruction sets and provide anti-malware and anti-tamper security. Systems described herein can be implemented in, for example, an embedded, real-time computer architecture.

FIG. 1 shows an example of a Harvard architecture 100. The Harvard architecture 100 can include a Central Processing Unit (CPU) 102, physically separate or independent instruction memory 104 and data memory 106, and Arithmetic Logic Unit (ALU) or Floating Point Unit (FPU) 108, and Input/Output (I/O) 110 lines to peripheral devices. The CPU can include the ALU or FPU 108, a Computer Control Unit (CCU) 107, and other control logic.

The instruction memory 104 can be read only memory and the data memory 106 can be read-write memory. The instruction memory 104 can be an operating system (OS) or an application memory. The data memory 106 can be an application memory. The instruction memory 104 and the data memory 106 can be physically separate or independent, such as to include no common or shared signal paths. The instruction memory 104 and the data memory 106 can be communicatively or electrically coupled to the CPU 102. The instruction memory 104 can include control logic. The data memory 106 can include read/write and control logic.

The ALU or FPU 108 can be configured to perform mathematical or other operations on data received from the CPU 102. The CPU 102 can instruct the ALU or FPU 108 which operations it is to perform and which data the ALU or FPU 108 is to perform the operations on.

The I/O 110 can be electrically or communicatively coupled to the CPU 102 and a peripheral device, such as a sensor, video, transceiver, Geographical Positioning System (GPS), or other peripheral device.

Figure 2:
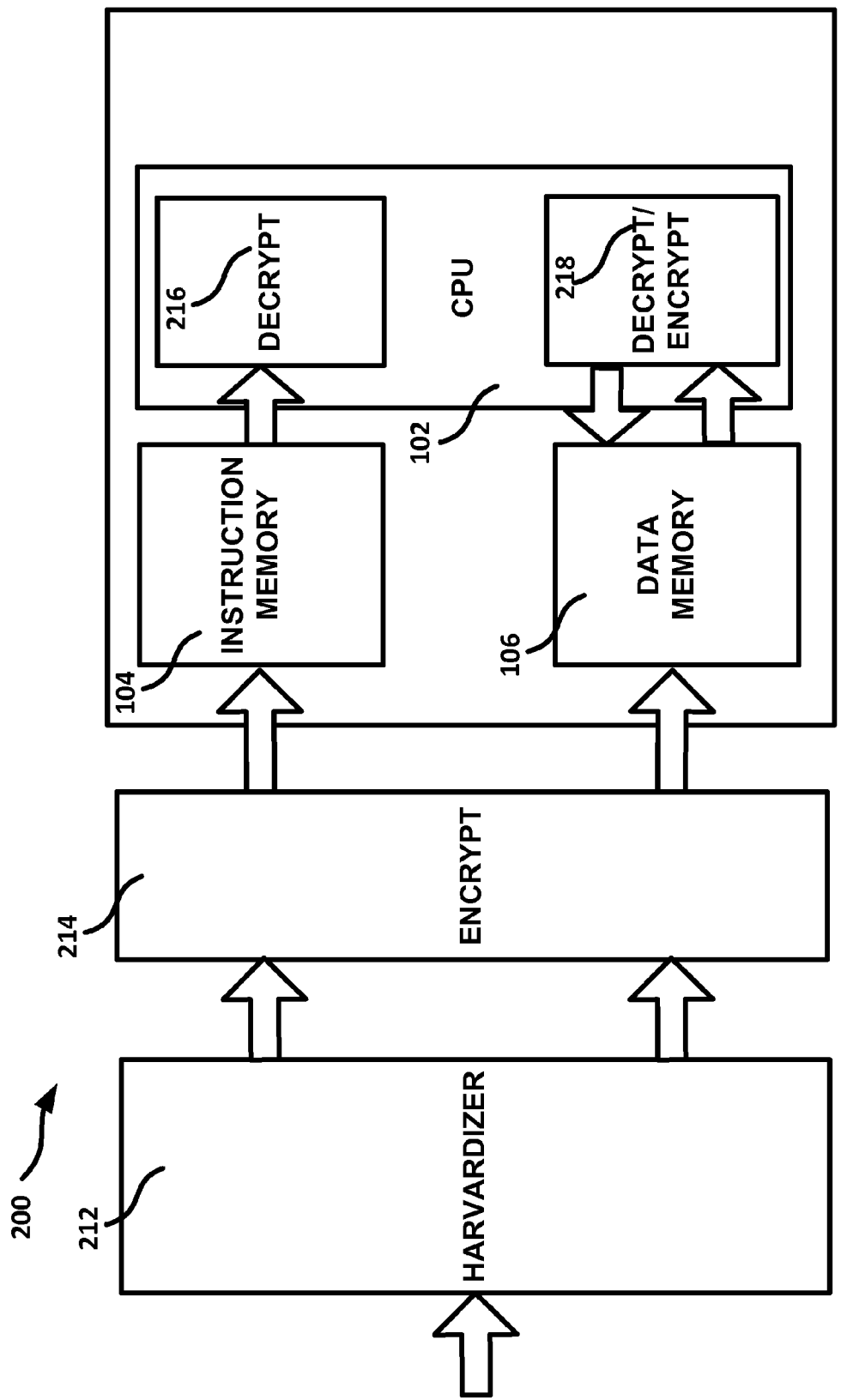
FIG. 2 shows a block diagram of an example of a "Harvardized" system.

FIG. 2 shows an example of a computer system 200 with a Harvard architecture that is configured to be tamper and malware resistant. The computer system 200 can include a harvardizer 212, an encryptor 214, the instruction memory 104, the data memory 106, a decryptor 216, a combination encryptor and decryptor 218, and the CPU 102.

The harvardizer 212 can receive data and instructions configured for use in a computer system with a Von Neumann architecture or another architecture where the data and instructions are comingled or not independent. The harvardizer 212 can be configured to separate the comingled data and instructions. For example, if the harvardizer 212 receives a bit string "0101010111110000" that is intended to be used in an eight-bit Von Neumann architecture, then the harvardizer 212 can parse the string into the instruction "01010101" and the data "11110000". The harvardizer 212 can be configured to determine how the data received is configured so that it can accurately parse the data and the instructions. The harvardizer 212 can send the parsed (e.g., separated) data to the data memory 106 and the instructions to the instruction memory 104.

The optional encryptor 214 can encrypt the parsed data or instructions from the harvardizer 212 and send them to the encrypted data to the data memory 106 and the encrypted instructions to the instruction memory 104. The optional decryptor 216 can receive encrypted instructions from the instruction memory 104 and send decrypted instructions to the CPU 102. The optional encryptor and decryptor 218 can receive encrypted data from the data memory 106 and send decrypted data to the CPU 102. The optional encryptor and decryptor 218 can receive data from the CPU 102 and send an encrypted version of the data to the data memory 106.

Figure 3:
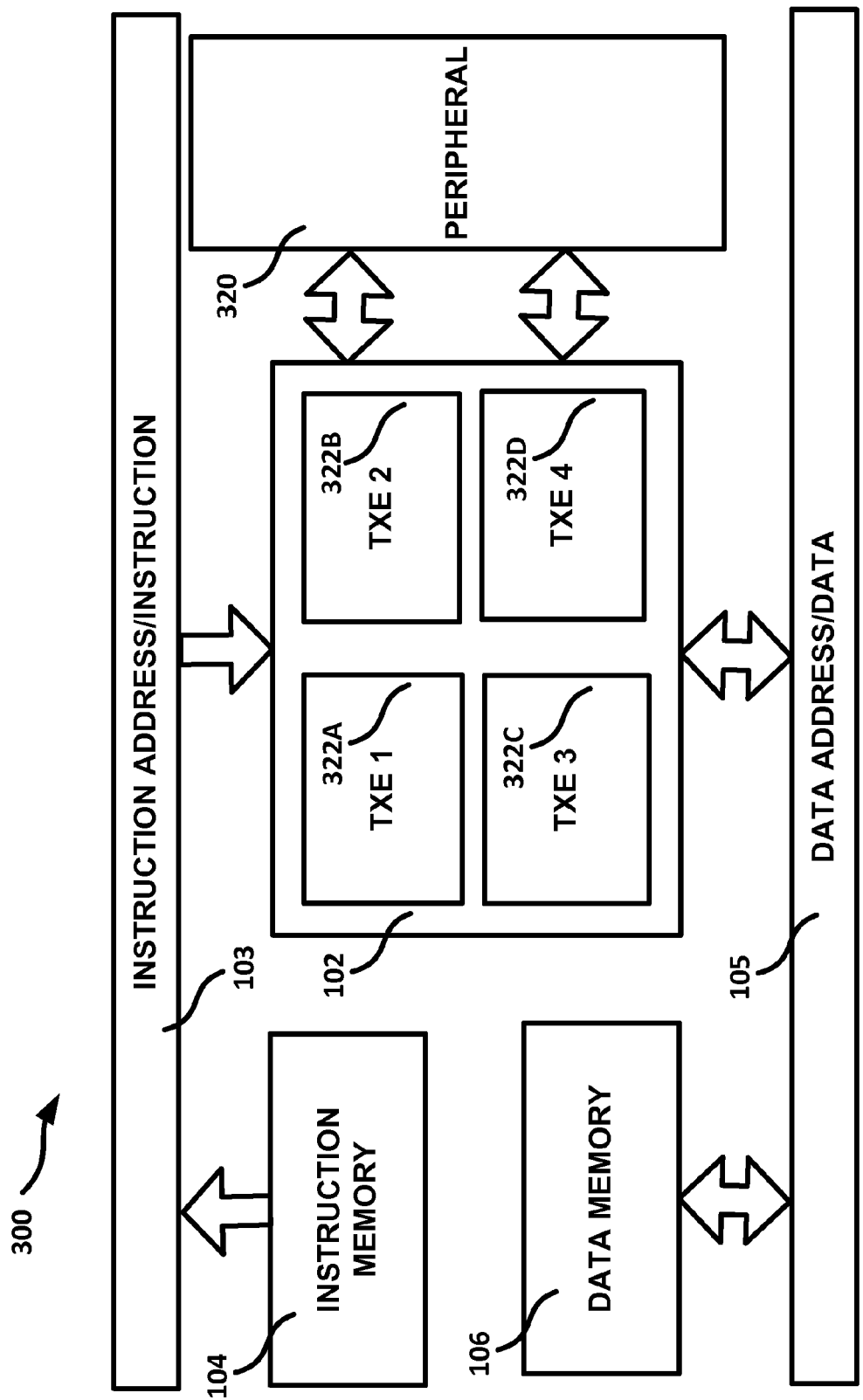
FIG. 3 shows a block diagram of an example of a computer system including Transformation eXecution Engines (TXEs).

FIG. 3 shows a block diagram of an example of a computer system 300 that can include the CPU 102, the instruction address/instruction bus 103, the instruction memory 104, the data address/data bus 105, the data memory 106, or a peripheral device 320. The CPU 102 can include one or more Transformation eXecution Engines (TXE) 322A-D. The TXEs 322 can be configured to receive instructions and data in a Harvard architecture format and execute the instructions as a function of the data. The data can be received from the data memory 106 or a peripheral device 320. The TXE 322 can be configured to execute legacy instructions received as a function of corresponding legacy data received. The TXE 322 can be configured to execute eight-bit code such as 1802 or Z80 8-bit code, 16-bit code, such as x86 code, 32-bit code, 64-bit code, or other bit codes. The TXE 322 can be configured to execute instructions coded in a specific language, such as Java, C, C++, Python, or Matlab, among others. The TXE 322 can provide application separation, execution assurance, or security between applications, such as by acting as a separation kernel.

The peripheral device 320 can be electrically or communicatively coupled to the CPU 102. The peripheral device 320 can be a sensor, video display or recording, audio transmission or recording, transceiver, Geographical Positioning System (GPS), or other peripheral device.

Figure 4:
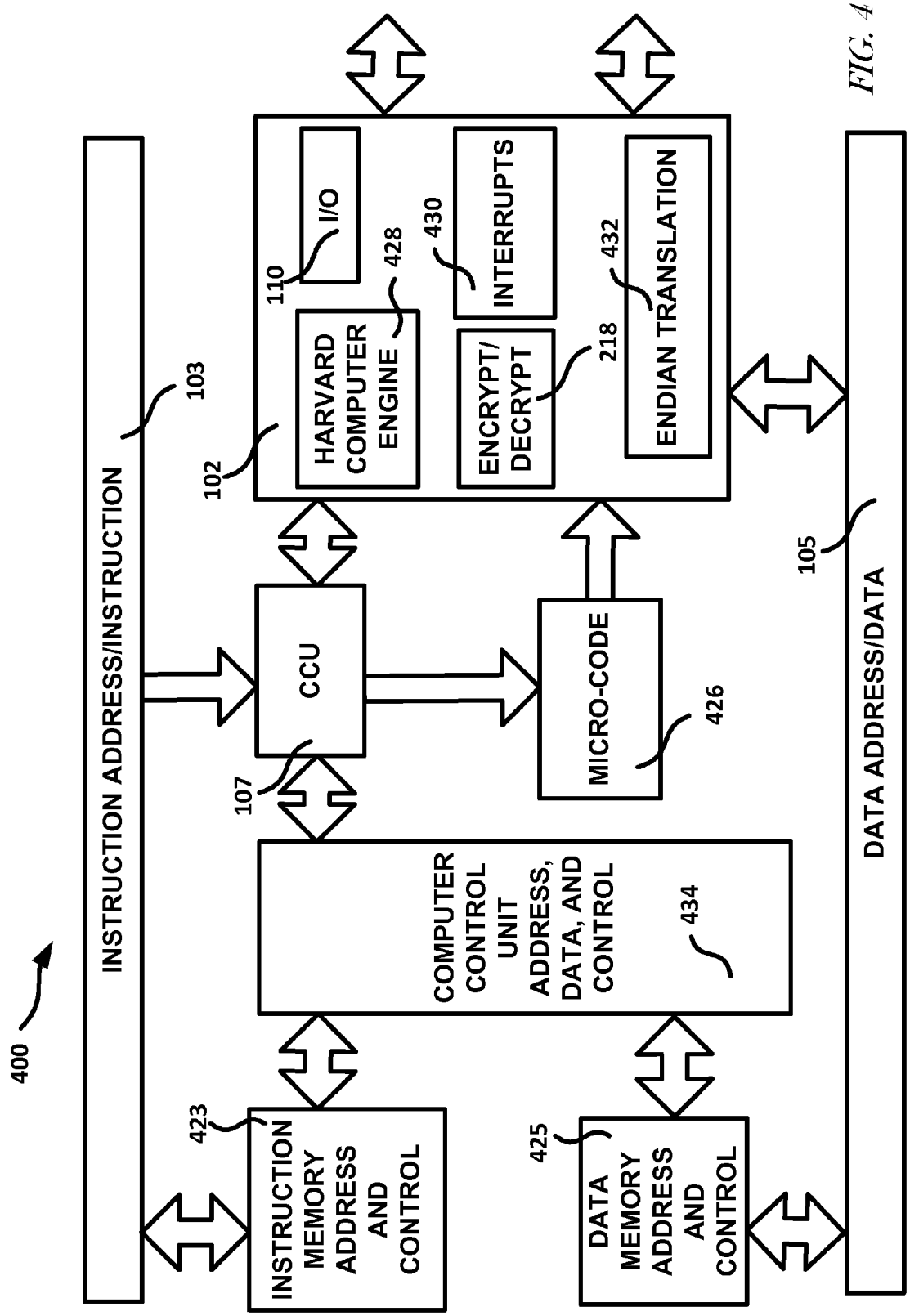
FIG. 4 shows a block diagram of an example of a microcoded computer system.

FIG. 4 shows a block diagram of another computer system 400 with a tamper or malware resistant architecture. The computer system 400 can include a CPU 102, the instruction memory address and control logic 423, the data memory address and control logic 425, a CCU 107, micro-code module 426, a computer control unit address, data, and control interconnect 434, an instruction address/instruction bus 103, or a data address/data bus 105.

The CPU 102 can include a Harvard computer engine 428, I/O 110, a combination encryptor and decryptor 218, an interrupt handler 430, or an endian translation module 432. The Harvard computer engine 428 can be configured to receive data and execute instructions in a Harvard architecture format. In one or more embodiments the Harvard computer engine 428 can be a TXE 322.

The I/O 110 can be electrically or communicatively coupled to a peripheral device 320. The interrupt handler 430 can be configured to intrude on currently running code and direct the CCU 107 to execute code in an interrupt routine. The endian translation module 432 can be configured to receive two or more bits and turn the two or more bits into a word that has a first bit as the least significant bit or a word that has a first bit as the most significant bit. The CPU 102 can be electrically or communicatively coupled to the CCU 107 and the micro-code module 426.

The CCU 107 can request instructions and data from the instruction memory address and control logic 423 and the data memory address and control logic 425, respectively. The CCU 107 can decode and execute the instructions and the data and command the ALU or FPU 108 (see FIG. 1) to perform an operation on the instructions and data. The CCU 107 can be communicatively or electrically coupled to the CPU 102, the instruction address/instruction bus 103, and the micro-code module 426. The micro-code module 426 can reside in a memory and translate machine instructions from the CCU 107 into sequences of operations, such as in an embedded system.

The CCU address, data, and control interconnect 434 can be configured to transmit control signals from the CCU 107 to the instruction memory address and control logic 423 and the data memory address and control logic 425. The CCU address, data, and control interconnect 434 can be configured transmit corresponding response signals from the instruction memory address and control logic 423 and the data memory address and control logic 425 to the CCU 107. The instruction memory address and control logic 425 can control the instruction memory 104 and the data memory address and control can control the data memory 106.

Figure 5:
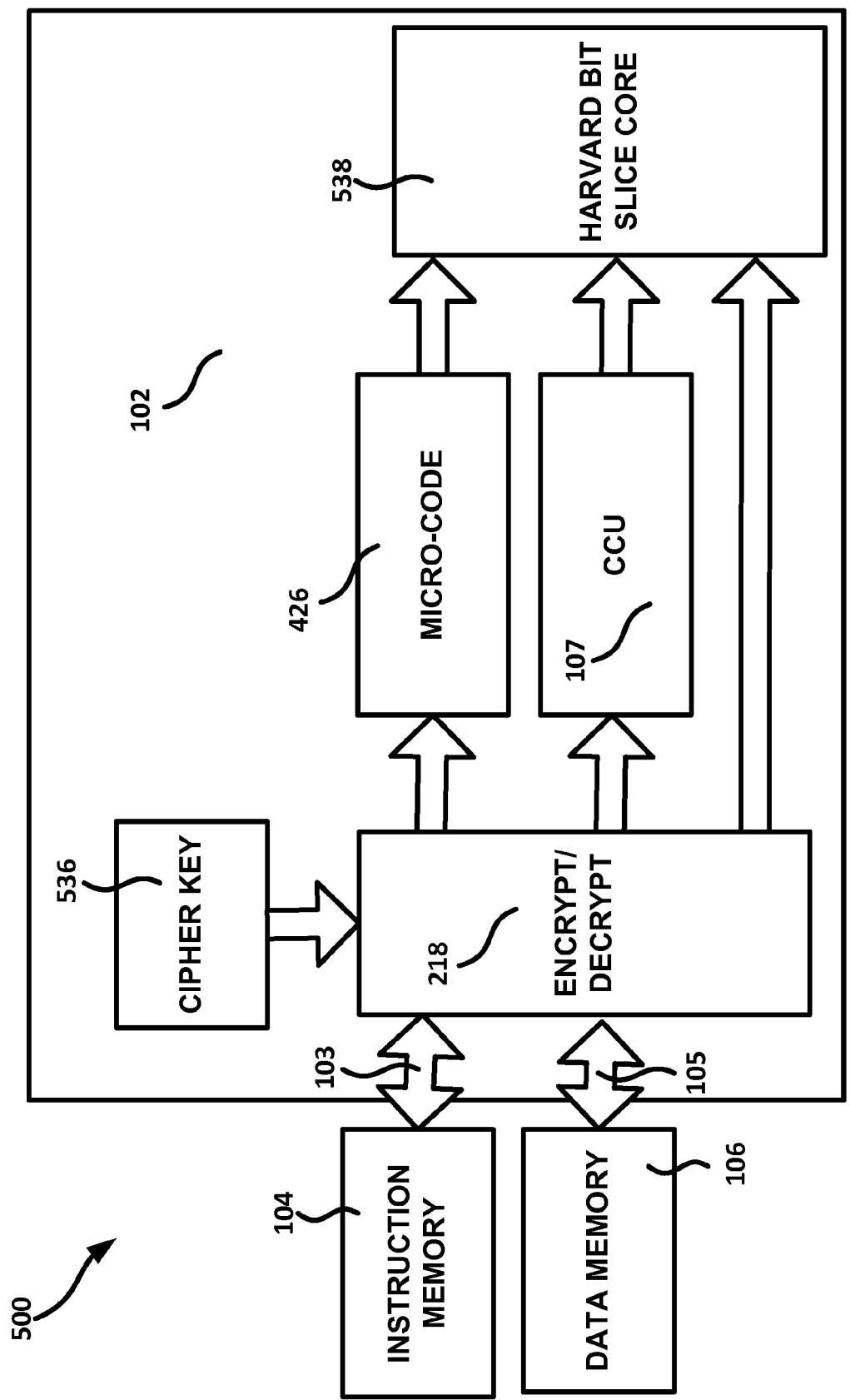
FIG. 5 shows a block diagram of an example of an instruction and data memory encryption/decryption system.

FIG. 5 shows a block diagram of another computer system 500 configured for tamper and malware resistance. The computer system 500 can include a CPU 102 electrically coupled to a CCU 107 and a micro-code module 426. The CPU 102 can include a Harvard bit-slice core. A Harvard bit-slice core 538 can include the ALU or FPU 108, register file or condition code logic, I/O 110, interrupt handler 430, encryptor 214, decryptor 216, encryptor and decryptor 218, or endian translation module 432. The Harvard bit-slice core can be configured to include concurrent access to data and instructions.

The CCU 107 and the micro-code module 426 can be electrically coupled to an encryptor and decryptor 218. The encryptor and decryptor 218 can be electrically or communicatively coupled to the instruction memory 104 and the data memory 106 through the instruction address/instruction bus 103 and the data address/data bus 105. The encryptor and decryptor 218 can receive a cipher key 536 that the encryptor and decryptor 218 can use to encrypt or decrypt the instructions or data received from the instruction memory 104 and the data memory 106. The cipher key 536 can be received from a Field Programmable Gate Array (FPGA) or other environment in which the system is used. In some situations, such as when the system is used in an FPGA, the cipher key 536 is not externally visible. In one or more embodiments decrypted data and instructions are prevented from being externally visible.

Figure 6:
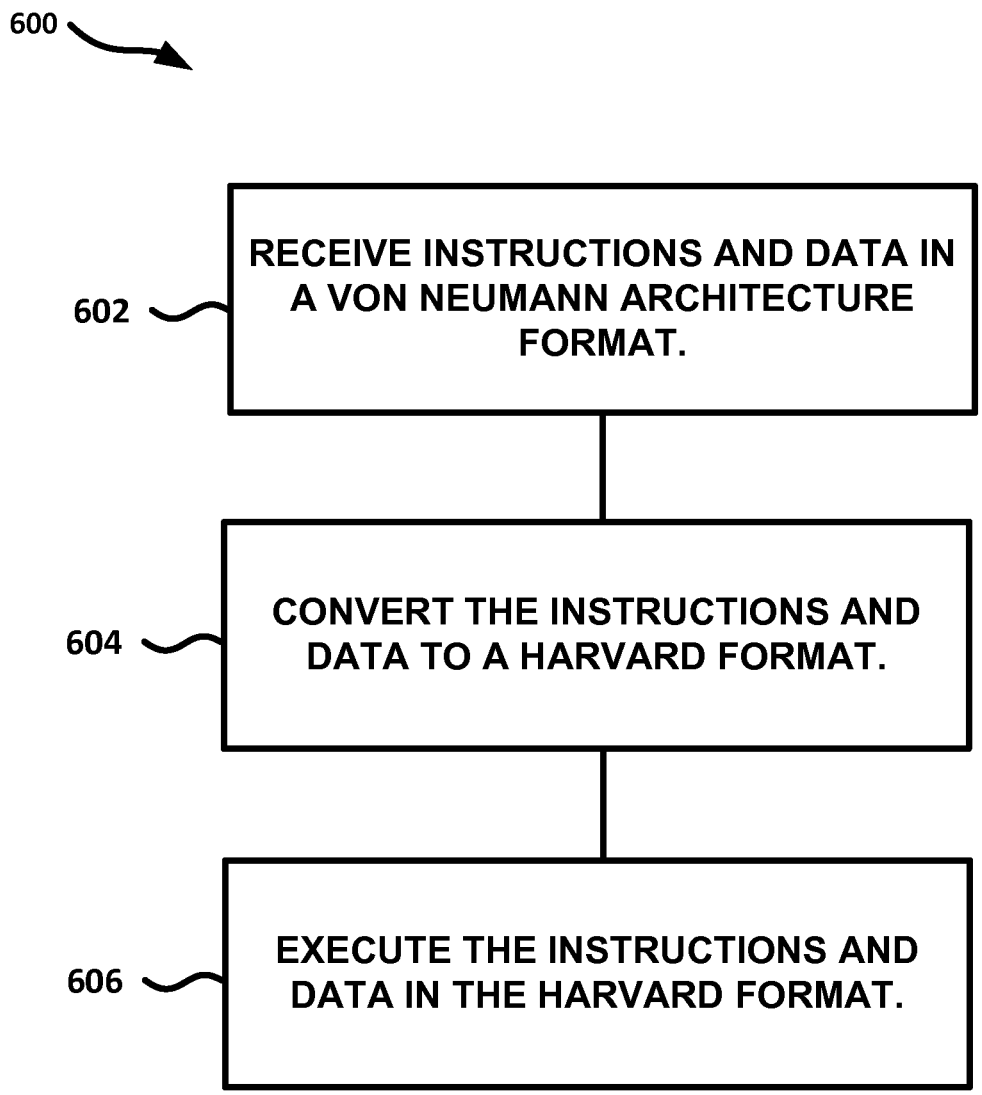
FIG. 6 shows a flow diagram of an example of a technique for using a Harvardized computer system.

FIG. 6 shows a flow diagram of a technique for tamper and malware resistant operation 600. At 602, instructions and data can be received, such as at the Harvardizer 212, in a Von Neumann architecture format. At 604, the received instructions and data can be converted to a Harvard format. That is the instructions and data can be separated from each other such that they are no longer comingled. At 606, the instructions and data that are in the Harvard format can be executed, such as by a CPU 102 that includes a TXE 322, a Harvard computer engine 428, an encryptor and decryptor 218, an interrupt handler 430, an endian translation module 432, or Harvard bit-slice core 538, among others.

An advantage of one or more embodiments can include providing hardware with increased security (e.g., tamper and malware resistance). This advantage can be enhanced by leveraging other advances in Field Programmable Gate Array (FPGA) security and density along with architectures described herein. Encryption in computer architectures described herein can help prevent code injection attacks on the computer system and can help prevent reverse engineering. Another advantage of one or more embodiments can include reducing the cost of mitigating new types of attacks.

An advantage of one or more embodiments that includes a bit-slice core (e.g., includes a Harvard bit-slice core 538) architecture can include providing a scalable architecture for implementing an architecture that can handle multiple address and data word widths. The bit-slice architecture can also allow for reuse of legacy code of varying word widths (e.g., 8-bit, 16-bit, 32, bit, etc.).

Another advantage can include using a minimal or near minimal number of resources required for the application. Another advantage can include varying the clock speed of the CPU 102 for power efficiency.

Another advantage of one or more embodiments can include automated transformation ("Harvardization") of legacy-application byte code. Yet another advantage of one or more embodiments can include compatibility with other anti-tamper mechanisms, such as code obfuscation, code signing, watermarking, or physical protection. Another advantage of one or more embodiments can include providing a redundant or reliable tamper or malware resistant computing platform.

Additional Notes and Examples

In Example 1 a computer system includes a harvardizer configured to receive comingled instructions and data and produce separated instructions and data.

In Example 2, the computer system of Example 1 includes a data memory configured to receive the separated data.

In Example 3, the computer system of at least one of Examples 1-2 includes an instruction memory physically separate from the data memory, the instruction memory configured to receive the separated instructions.

In Example 4, the computer system of at least one of Examples 1-3 includes one or more processors configured to execute the separated instructions and data.

In Example 5, the computer system of at least one of Examples 1-4 includes one or more encryptors configured to encrypt the separated instructions and data from the harvardizer, the one or more encryptors coupled between the harvardizer and the instruction and data memories.

In Example 6, the computer system of at least one of Examples 1-5 includes one or more decryptors configured to decrypt the encrypted instructions and data, the one or more decryptors coupled to at least one of the instruction memory and the data memory.

In Example 7, the one or more processors of at least one of Examples 1-6 the one or more processors includes one or more transformation execution engines configured to execute legacy code configured in a Harvard format.

In Example 8, the one or more transformation execution engines of at least one of Examples 1-7 includes a first transformation execution engine configured to execute at least one of eight bit instructions and data, sixteen bit instructions and data, and thirty-two bit instructions and data.

In Example 9, the one or more transformation execution engines of at least one of Examples 1-8 include a second transformation execution engine configured to execute sixteen bit instructions and data.

In Example 10, the one or more transformation execution engines of at least one of Examples 1-9 include a transformation execution engine configured to execute thirty-two bit instructions and data.

In Example 11 a computer is configured to receive instructions and data in a Von Neumann architecture format, convert the instructions and data to a Harvard architecture format, and execute the instructions and data in the Harvard architecture format.

In Example 12, the computer of at least one of Examples 1-11 includes a harvardizer configured to convert the instructions and data to the Harvard architecture format, wherein the Harvard architecture format includes separate data and instructions and the Von Neumann architecture format includes comingled data and instructions.

In Example 13, the computer of at least one of Examples 1-12 includes one or more transformation execution engines configured to execute the instructions and data in the Harvard architecture format.

In Example 14, the computer of at least one of Examples 1-13 includes one or more encryptors configured to encrypt the converted instructions and data.

In Example 15, the computer of at least one of Examples 1-14 includes an instruction memory configured to receive encrypted instructions from the one or more encryptors.

In Example 16, the computer of at least one of Examples 1-15 includes a data memory configured to receive encrypted data from the one or more encryptors.

In Example 17, the computer of at least one of Examples 1-16 includes one or more decryptors configured to decrypt the encrypted instructions and data and send the decrypted instructions and data to a transformation execution engine of the one or more transformation execution engines.

In Example 18 a method includes receiving, at a computer, instructions and data in a Von Neumann format, converting the instructions and data to a Harvard format, and executing the instructions and data in the Harvard format.

In Example 19, the method of at least one of Examples 1-18 includes encrypting the converted instructions and data.

In Example 20, the method of at least one of Examples 1-19 includes sending the encrypted instructions to an instruction memory.

In Example 21, the method of at least one of Examples 1-20 includes sending the encrypted data to a data memory, the data memory physically separate from the instruction memory.

In Example 22, the method of at least one of Examples 1-21 includes decrypting the encrypted instructions and data.

In Example 23, the method of at least one of Examples 1-22 includes sending the decrypted instructions to one or more processors on an instruction signal path and the decrypted data to the one or more processors on a data signal path, the data signal path physically separate from the instruction signal path.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the disclosed subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The functions or algorithms described herein are implemented in hardware, software, or a combination of software and hardware in some embodiments. The software can comprise computer executable instructions stored on computer readable media such as memory or other type of storage devices. Further, described functions can correspond to modules, which can be software, hardware, firmware, or any combination thereof. Multiple functions are performed in one or more modules as desired, and the embodiments described are merely embodiments. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, process flows can be applicable to software, firmware, and hardware implementations.

Systems and methods of the present disclosure can be implemented on a mobile device as a mobile application, web-based application, on a desktop computer as a computer application, or a combination thereof. A mobile application can operate on a Smartphone, tablet computer, portable digital assistant (PDA), ruggedized mobile computer, or other mobile device. The mobile device can be connected to the Internet or network via Wi-Fi, Wide Area Network (WAN), cellular connection, WiMax, Serial Front Panel Data Port (Serial FPDP), Rapid I/O Transport, or any other type of wired or wireless method of networking connection. In some embodiments, a web-based application can be delivered as a software-as-a-service (SaaS) package (e.g., cloud-based embodiments) accessible via a device app, a web browser application, or other suitable application, depending on the particular embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A computer system comprising:
   a harvardizer configured to receive comingled instructions and data and produce separated instructions and data;
   a first encryptor connected to the harvardizer to receive the separated data and generate encrypted data;
   a data memory connected to the first encryptor configured to receive the encrypted data;
   a first decryptor connected to the data memory to decrypt the encrypted data;
   a second encryptor connected to the harvardizer to receive the separated instructions and generate encrypted instructions;
   an instruction memory physically separate from the data memory connected to the second encryptor, the instruction memory configured to receive the encrypted instructions;
   a second decryptor connected to the instruction memory to decrypt the encrypted instructions; and
   one or more processors connected to the first and second decryptors and configured to process the separated instructions and data, the one or more processors including a first transformation execution engine to process sixteen-bit decrypted data and decrypted instructions, a second transformation execution engine to execute thirty-two bit decrypted data and decrypted instructions, and a third transformation execution engine to execute sixty-four bit decrypted data and decrypted instructions, wherein the data memory and the instruction memory are configured in a pure Harvard architecture format.

2. The computer system of claim 1, wherein the one or more processors includes one or more transformation execution engines configured to execute legacy Von Neumann code configured in a Harvard format.

3. The computer system of claim 2, wherein the one or more transformation execution engines include a fourth transformation execution engine configured to eight bit instructions and data.

4. A method comprising:
   receiving, at a computer, instructions and data in a Von Neumann format;
   converting the instructions and data to a Harvard format by separating the comingled instructions and data;
   encrypting the separated instructions and storing the encrypted instructions in an instruction memory;
   encrypting the separated data and storing the encrypted data in a data memory, wherein the instruction memory and the data memory are configured in a pure Harvard architecture format;
   decrypting the encrypted data and sending the decrypted data to a transformation execution engine of a plurality of transformation execution engines;
   decrypting the encrypted instruction and sending the decrypted instructions to the transformation execution engine, the plurality of transformation execution engines including a first transformation execution engine to process sixteen-bit decrypted data and decrypted instructions, a second transformation execution engine to execute thirty-two bit decrypted data, and a third transformation execution engine to execute sixty-four bit decrypted data; and
   processing, using the transformation execution engine, the decrypted data and instructions.

* * * * *